US011509619B2

(12) United States Patent
Govil et al.

(10) Patent No.: US 11,509,619 B2
(45) Date of Patent: Nov. 22, 2022

(54) TECHNIQUES TO PROVIDE STREAMING DATA RESILIENCY UTILIZING A DISTRIBUTED MESSAGE QUEUE SYSTEM (71) Applicant: Capital One Services, LLC, McLean, VA (US)

(72) Inventors: Lavangana Govil, Glen Allen, VA (US); Vijayasuriya Ravi, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 117 days.

(21) Appl. No.: 16/881,469

(22) Filed: May 22, 2020

(65) Prior Publication Data

US 2021/0218699 A1 Jul. 15, 2021

Related U.S. Application Data (60) Provisional application No. 62/961,059, filed on Jan. 14, 2020.

(51) Int. Cl.
*H04L 51/23* (2022.01)
*H04L 9/40* (2022.01)
*G06F 9/54* (2006.01)

(52) U.S. Cl.
CPC ............ *H04L 51/23* (2022.05); *G06F 9/546* (2013.01); *H04L 63/08* (2013.01)

(58) Field of Classification Search
CPC .......... H04L 51/30; H04L 63/08; G06F 9/346
USPC ........................................................ 709/206
See application file for complete search history.

(56) References Cited

U.S. PATENT DOCUMENTS

| 10,536,392 | B2 | 1/2020 | Kaitha et al. | |
|---|---|---|---|---|
| 2002/0120717 | A1* | 8/2002 | Giotta | G06F 9/542 709/219 |
| 2004/0006550 | A1* | 1/2004 | Upton | G06F 9/541 |
| 2004/0034640 | A1 | 2/2004 | Jain et al. | |
| 2008/0196039 | A1* | 8/2008 | Garrard | H04L 47/2458 719/314 |
| 2012/0110394 | A1* | 5/2012 | Murakami | G06F 9/5072 714/48 |

(Continued)

OTHER PUBLICATIONS

Van Unen, Tara, Using Amazon SQS Dead-Letter Queues to Control Message Failure, Jun. 7, 2017, Amazon Web Services, https://aws.amazon.com/blogs/compute/using-amazon-sqs-dead-letter-queues-to-control-message-failure/ (Year: 2017).*

(Continued)

*Primary Examiner* — James E Springer
(74) *Attorney, Agent, or Firm* — KDB (57) ABSTRACT Embodiments include techniques to receive and process data from a data service provider, communicate a plurality of messages comprising the data to a streaming data platform and detect a failure of delivery of the plurality of messages to the streaming data platform. Embodiments further include techniques communicate the plurality of messages to a distributed message queue service of a distributed message queue system, publish each of the plurality of messages to the streaming data platform, determine each of the plurality of messages published to the streaming data platform was successful or unsuccessful, and retry publication of each unsuccessfully published message of plurality of messages to the streaming data platform.

18 Claims, 8 Drawing Sheets

(56) References Cited

U.S. PATENT DOCUMENTS

| | | |
|---|---|---|
| 2018/0359201 A1 | 12/2018 | Rangasamy et al. |
| 2019/0149504 A1 | 5/2019 | Norwood et al. |
| 2019/0261222 A1* | 8/2019 | Raleigh ................. H04W 28/02 |
| 2019/0265971 A1 | 8/2019 | Behzadi et al. |
| 2020/0348662 A1* | 11/2020 | Cella .................... G05B 23/024 |
| 2022/0150187 A1* | 5/2022 | Venkatesan ............. H04L 67/55 |

OTHER PUBLICATIONS

International Search Report and Written Opinion for International Patent Application No. PCT/US2021/013345 dated May 6, 2021, 11 pages.

* cited by examiner

TECHNIQUES TO PROVIDE STREAMING DATA RESILIENCY UTILIZING A DISTRIBUTED MESSAGE QUEUE SYSTEM

RELATED APPLICATIONS

This application claims priority to U.S. Provisional Application No. 62/961,059, titled "TECHNIQUES TO PROVIDE STREAMING DATA RESILIENCY UTILIZING A DISTRIBUTED MESSAGE QUEUE SYSTEM" filed on Jan. 14, 2020. The contents of the aforementioned application are incorporated herein by reference in their entirety.

BACKGROUND

Real-time data processing environments can include diverse types of data systems and devices that provide and process data. In instances, the real-time data may be time-critical and/or mission-critical data that needs to be processed and provided to other systems in a timely manner. For example, a banking system may be required to process large amounts of real-time data to perform various banking functions including processing transactions and providing fraud detection. When a failure occurs, it is critical that data is not lost and the systems are returned to an operating state as quickly as possible. Embodiments discussed herein are directed to solving these and other problems.

SUMMARY

Embodiments discussed herein are directed to providing streaming data in a resilient manner. For example, embodiments may include devices, systems, components, and so forth to provide techniques and computer-implemented including receiving data from a data service provider, communicating one or more messages comprising the data to a streaming data platform, and detecting failures of delivery of a message of the one or more messages to the streaming data platform. Embodiments further include communicating the message to a distributed message queue service, wherein the message is communicated to the distributed message queue service based on the detection of the failure of delivery and stored in a queue of a distributed message queue system. The system includes publishing the message to the streaming data platform, determining whether the message published to the streaming data platform was successful or unsuccessful, and retrying publishing of the message to the streaming data platform when publication of the message is unsuccessful.

DETAILED DESCRIPTION

Embodiments are generally directed to providing resiliency in capturing and processing streaming data from one or more data sources. More specifically, embodiments include utilizing a distributed cloud-based message queue system to process and provide messages including the data from real-time data streams. In one configuration, a streaming system may include applications that receive and process the streaming data. The applications may provide the processed data to a streaming data platform that may be used by other consumer applications to further process and/or store the data. For example, the streaming data platform may be used to provide intelligent real-time decisions for customers utilizing the system. In some instances, data from an application to the streaming data platform may be failed to be delivered. In these instances, the undelivered data may be provided to the distributed message queue system to store in a queue and provide to the streaming data platform once any issues are resolved.

In another configuration, the streaming may include the applications that may receive the data, process the data, and utilize the distributed message queue system to send all of the processed data to the streaming data platform. In this configuration, when a failure of delivery occurs, the application may retry to send the undelivered to the streaming data platform. These and other details will become apparent in the follow description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives within the scope of the claims.

Figure 1:
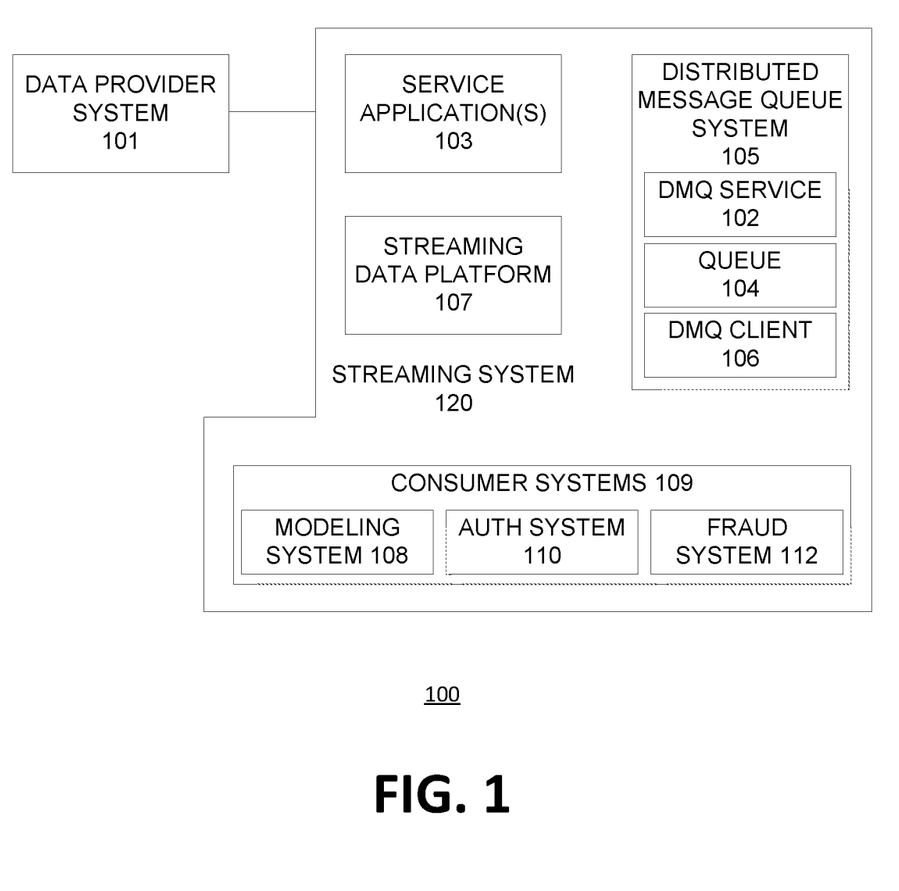
FIG. 1 illustrates an example configuration of a system to process data and provide streaming data resiliency.

FIG. 1 illustrates a system 100 to process streaming data in real-time or near real-time while providing resilient backup capabilities utilizing a distributed message queue system 105 and services 102. The data may be provided by one or more systems based on any number of event occurrences. Generally, the data is received by a streaming system 120 to process and provide to other internal systems, such as consumer systems 109. These systems may do additional processing with the data to provide insights. In one example, the system 100 may be part of a banking platform and the streaming data may be related to banking functions, such as performing transactions, processing credit or loan applications, and other general banking functions. In embodiments, the data may be required to perform critical functions, such as fraud detection, transaction authentication, loan/credit approval, and so forth. Utilization of the distributed messages queue system 105 ensures that the system 100 may continue to provide critical functionality with fault tolerance by providing backup data paths and logging capabilities.

In embodiments, the system 100 may include a streaming data system 120 that may receive and process the streaming data from one or more internal or external data sources, such as a data provider system 101. A data provider system 101 may be any type of computing system that may provide data in real-time or near real-time and in a streaming manner. In one example, the data provider system 101 may be a payment processing system, such as TSYS®, SQUARE®, STRIPE®, Synovus Financial Corp, Fiserv, First Data Corp., and so forth, and may communicate data to the streaming system 120 while performing transactions. The data may include transaction data, e.g., merchant identifying information, price of transactions, time/date of transactions, etc. The data may also include authentication data for customers, e.g., the user or card identifier, account number or token, card security code of verification value, expiration date, etc. The data provider system 101 may provide the data while a transaction is occurring and may be utilized by one or more of the consumer systems 109 to provide insights and make determinations, e.g., authenticating the user, detecting fraud, providing incentives, updating models, and so forth. In embodiments, system 100 may include more than one or more data provider systems 101 and are not limited in this manner. For example, additional data provider systems 101 may include a customer service system providing customer service information, a news service system providing news, a rewards system providing rewards data, a voice response system providing voice response data.

In embodiments, the streaming system 120 that may receive the data through one or more application programming interfaces (APIs) portals coupled with the one or more data provider system(s) 101. In embodiments, the data may be received by one or more service application(s) 103 of the streaming system 120 configured to send the streaming data to a streaming data platform 107. A service application 103 may be a software engine or component to couple with one or more of the APIs to receive the data from a data provider system 101, process the data, and provide the data to the consumer systems 109. The streaming data platform 107 may process data in a Java® format and may utilize a binary transmission control protocol (TCP)-based protocol. Further, the service application 103 may utilize a producer API to publish streams of records in a Java format. In other instances, the streaming data platform 107 may utilize a consumer API and subscribe to streams of records in a Java format.

Figure 2A:
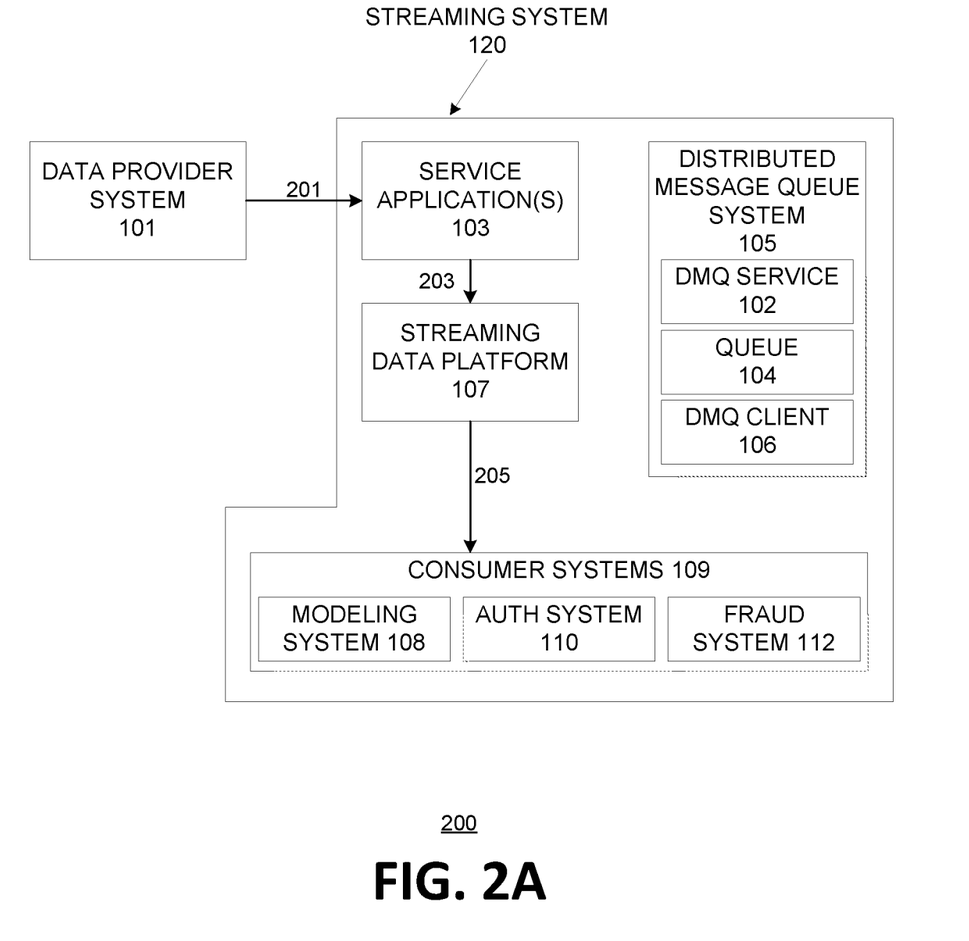
FIG. 2A illustrates an example processing flow to process data via a streaming data platform.

In one example configuration, as illustrated in FIGS. 2A/2B, a service application 103 may provide the processed data in one or more messages directly to the streaming data platform 107 to publish to the consumer systems 109. In this configuration, the distributed message queue system 105 may only be utilized during data loss events as a backup to ensure that undelivered messages are eventually delivered to the streaming data platform 107. In another configuration, as illustrated in FIGS. 3A/3B, a service application 103 may utilize the distributed message queue system 105 to provide the processed data to the streaming data platform 107. In this configuration, the service application 103 may handle undelivered data. More specifically, the distributed message queue system 105 may notify the service application 103 of undelivered data and the service application 103 may send the undelivered processed data directly to the streaming data platform 107 to publish to the consumer systems 109.

In embodiments, the streaming system 120 may include a number of different service application(s) 103 to perform various operations to process the streaming data. In one example, a service application 103 may be an authentication engine to receive and process data for authentication, e.g., processing authentication request data to make authentication decisions. In another example, the service application 103 may be a fraud engine to process data for fraud detection, e.g., transaction information, location of the transaction, amount of transaction, e.g., make real-time fraud determinations. In a third example, the service application 103 may be a modeling engine to receive and process data for model scoring, e.g., determining model features and scores, detecting model errors and warnings, and utilizing transaction data, analytical data, and other data for data validation.

In embodiments, the streaming data platform 107 may receive processed data either directly from a service application 103 or from the distributed message queue system 105, as previously discussed. The streaming data platform 107 may publish the data for one or more of the consumer systems 109 to further process and/or store the data. For example, a consumer system 109 may include a modeling system 108 that may receive the data including model scoring to update models, generate new models, perform model validation, and store in a data store. In another example, the consumer system 109 may include an authentication system 110 to further process the data for authentication and store authentication decisions in a data store. In a third example, the consumer system 109 may include a fraud system 112 to further process data to perform fraud defensive actions, update account statuses, apply account restrictions, create a fraud case, and trigger alerts.

In embodiments, the streaming system 120 may be part of a critical system providing banking services to customers and providers, such as transaction processing and fraud detection. Thus, any data loss is detrimental to the streaming system 120 and consumer systems 109 utilizing the data. Previously solutions used systems and servers to log the data and where, at times, subject to the same outages and the primary system processing the data. In one example, previous systems utilized a system configured with APACHE® including APACHE's log4j to log data during a failure event and provide once the primary system came back online. However, in some instances, when the failure event occurred it would also take down the APACHE® system itself. In other instances, when APACHE's log4j did log data during a failure, it was slow to come online, e.g., fifteen plus minutes.

Embodiments discussed herein were developed to provide a store and forward solution to provide resiliency and to eliminate failure event downtime. More specifically, embodiments include utilizing a distributed message queue system 105 having a distributed message queue service 102, a queue 104, and a distributed message client 106 to store and forward data during failure events. In one example, the distributed message queue system 105 may be a cloud-based system, such as Amazon Web Services (AWS®), and the distributed message queue service 102 may be AWS's Simple Queue Service (SQS®). Moreover, the distributed message queue client 106 may be AWS's Lambda® client.

In embodiments, as previously mentioned, the distributed message queue system 105 may be utilized only when a failure is detected. More specifically, a service application 103 may receive streaming data, process the streaming data, and generate one or more messages to send the data to the streaming data platform 107. The service application 103 may communicate directly, e.g., without utilizing the distributed message queue system 105, the streaming data to the streaming data platform 107. In one example, a redirection function of SQS may be set to true, e.g., 'redirect.sdp.messages.to.sqs=false,' for the service application 103.

In some instances, the service application 103 may detect a failure of delivery of one or more messages to the streaming data platform 107. For example, the service application 103 may receive or determine a delivery timeout (100 milliseconds (ms)) or determine a connectivity failure. In these instances, the service application 103 may be configured to redirect the failed messages to the distributed message queue system 105 to ensure that streaming data corresponding to the failed messages is not lost and is ultimately delivered to the streaming data platform 107 and consumer systems 109. In some embodiments, the distributed message queue system 105 may be configured to trigger an alarm when failed messages are being delivered. The alarm may trigger when a specified number of 'error' messages are received and processed. For example, a cloud watch alarm for error monitoring with metric filter—"ERROR"—GUID for>10 in 5 min. Also QueueDepth CloudWatch alarm may be setup from the distributed message queue system for >1000 in 1 min for 3 times.

In embodiments, the service application 103 may communicate via an API the one or more failed messages to the distributed message queue system 105. More specifically, the service application 103 may invoke or utilize the distributed message queue service 102 and send the message(s) for storage in queue 104. In embodiments, the queue 104 may be an encrypted queue with one or more topics configured for notification in each region for each application. In one example, the service application 103 may invoke the 'SendMessageRequest' instance of SQS and include the name of the queue (sqs.queueName=), a region of the queue (sqs.region=), and body of the message. The request is then passed to the distributed message queue service 102 send message method, which may return a send message response object.

In embodiments, the distributed message queue system 105 may publish or send the messages to the streaming data platform 107 and/or maintain them in queue 104 until they can be delivered. More specifically, the distributed message queue client 106 may publish the message(s) to the streaming data platform 107. In one example, the distributed message queue client 106 may poll the queue 104 for the message and send the messages to the streaming data platform 107. The queue 104 may be configured on the distributed message queue system 105 as an event source for the client 106. When an event occurs, a message or record of the message is in the queue 104, and the event may be triggered and detected by the client 106. The client 106 may retrieve the message(s) from the queue 104 and send the message(s) as a single message or in a batch, e.g., five messages.

In some embodiments, each service application 103 may be configured with an associated queue 104, and the client 106 may process and send data the streaming data platform 107 based on which queue 104 has the data. In other instances, a single queue 104 may be used for all of the service applications 103 and the client 106 may automatically discover the correct consumer for the streaming data platform 107 based on a message envelope.

The distributed message queue client 106 may determine whether the message published to the streaming data platform 107 was delivered successfully or unsuccessfully. In some instances, the streaming data platform 107 may not be able to handle and/or receive the message(s) from the distributed message queue client 106. For example, the streaming data platform 107 may throttle the data, an error may be returned to the client 106, the platform 107 may not respond, etc. The distributed message queue client 106 may retry publishing the messages(s) to the streaming data platform 107 when the publication of the message(s) are unsuccessful and until the message(s) are successfully delivered or a period of time has expired. In some instances, the distributed message client 106 may send the message(s) unsuccessfully delivered back to the queue 104 until some later point in time prior to retrying publication. For example, the client 106 may send the message(s) back to the queue 104, wait 1000 ms, and then retry publishing the message(s) to the streaming data platform 107. Note that embodiments are not limited in this manner and the time is configurable.

In some embodiments, as previously discussed, the service application 103 may send all of the messages to the distributed message queue system 105 to send to the streaming data platform 107. For example, the service application 103 may set a redirection function to true, e.g., 'redirect.sdp.messages.to.sqs=true,' to have all of the messages send to the distributed message queue system 105 and handled by the distributed message queue service 102. For example service application 103 may, communicate via API messages including the streaming data and processed streaming data to the distributed message queue service 102. The distributed message queue service 102 may store each of the messages the queue 104 for publishing to the streaming data platform 107 In one example, the service application 103 may invoke the 'SendMessageRequest' instance of SQS and include the name of the queue 104 and the body of the message. The request is then passed to the distributed message queue service 102 send message method, which may return a send message response object to the service application 103.

The distributed message queue system 105 may utilize the distributed message queue client 106 to publish each of the one or more messages stored in the queue 104 to the streaming data platform 107. For example, the distributed message queue client 106 may poll the queue 104 for the message(s) and send the message(s) to the streaming data platform 107. As discussed above, the queue 104 may be configured on the distributed message queue system 105 as an event source for the client 106. When an event occurs, a message or record of the message is in the queue 104 and an event may be triggered and detected by the client 106. The client 106 may retrieve the message(s) from the queue 104 and send the message(s) as a single message or in a batch, e.g., five messages.

In some instances, the message(s) may not be delivered to the streaming data platform 107. The distributed message queue client 106 may determine whether the message published to the streaming data platform 107 was delivered successfully or unsuccessfully. In these instances, the distributed message queue client 106 may store the undelivered messages back in the queue 104 and the distributed message queue service 102 may return an object to the service application 103 that a failure of delivery occurred. In embodiments, the service application 103 may determine a failure of delivery that occurred based on the information received from the distributed message queue system 105. In these instances, the service application 103 may communicate undelivered messages directly to the streaming data platform 107.

In embodiments, the service application 103 may retry sending the undelivered messages to the streaming data platform 107. For example, the service application 103 may determine whether the message communicated directly to the streaming data platform 107 was successful or unsuccessful and retry communication of the message to the streaming data platform 107 when the message is unsuccessful. The service application 103 may continue to retry to communicate the message until delivery of to the streaming data platform 107 is successful or a defined period of time has expired.

FIG. 2A illustrates an example processing flow 200 of system 100 where the service application 103 sends messages directly to the streaming data platform 107 unless there is a failure. In the illustrated processing flow 200 messages are being delivered to the streaming data platform 107 without failures.

At line 201 of processing flow 200, the service application 103 may receive streaming data from one or more data provider systems 101. As mentioned, the streaming data may include data to perform banking functions. The service application 103 may receive the data, process the data, and generate one or more messages of the streaming data to send to the streaming data platform 107.

At line 203, the service application 103 may send the one or more messages to the streaming data platform 107. And at line 205, the streaming data platform 107 may send the messages to the consumer system 109. In some instances, the streaming data platform 107 may publish the data and one or more of the consumer system 109 may subscribe and receive particular data. For example, the modeling system 108 and authentication system 110 may subscribe and receive authentication data. In another example, the fraud system 112 may subscribe and receive fraud data. In a third example, the modeling system 108 may subscribe and receive model data.

Figure 2B:
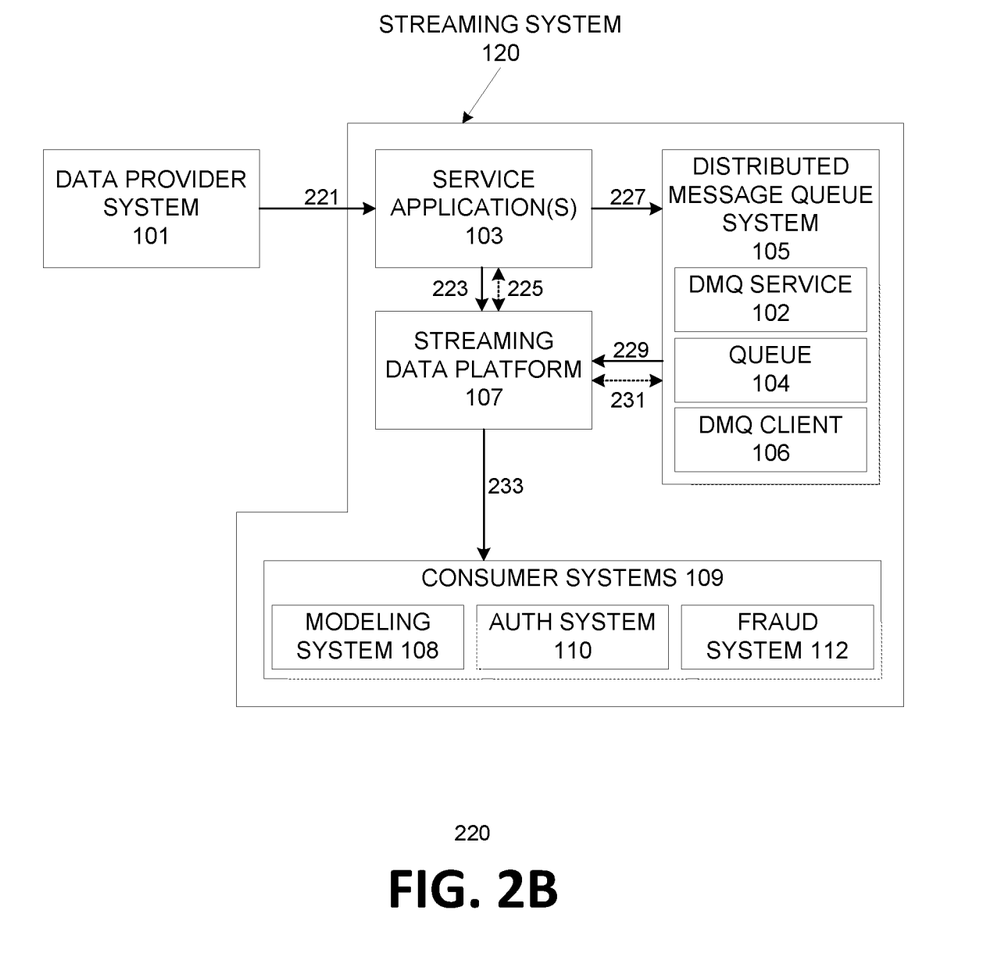
FIG. 2B illustrates an example processing flow to provide streaming data resiliency.
Figure 3A:
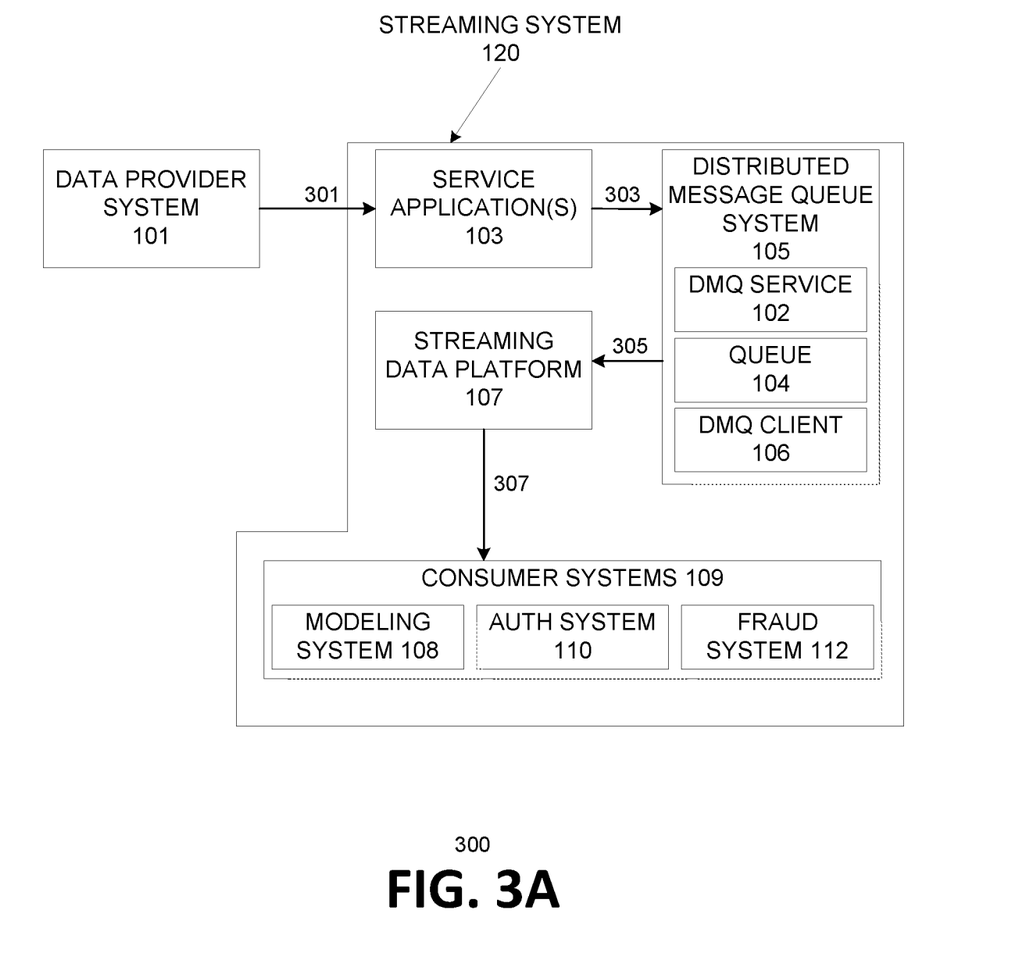
FIG. 3A illustrates a second example processing flow to process data via a streaming data platform.

FIG. 2B illustrates an example processing flow 220 in the same configuration as FIG. 2A; however, a failure event is handled.

At line 221 of processing flow 220, the service application 103 may receive streaming data from one or more data provider systems 101. The service application 103 may receive the data, process the data, and generate one or more messages of the streaming data to send to the streaming data platform 107.

At line 223, the service application 103 may send the one or more messages to the streaming data platform 107. In some instances, the service application 103 may detect a failure of delivery of one or more the messages to the streaming data platform 107 as indicated by dotted line 225. In these instances, the service application 103 may be configured to redirect the failed messages to the distributed message queue system.

At line 227, the service application 103 may communicate via an API the one or more failed messages to the distributed message queue system 105. For example, the service application 103 may invoke or utilize the distributed message queue service 102 and send the message(s) for storage in queue 104.

In embodiments, at line 229, the distributed message queue system 105 including the distributed message queue client 106 may publish or send the messages to the streaming data platform 107. In some instances, the streaming data platform 107 may not receive the messages and/or the messages may not be deliverable to the streaming data platform 107. The distributed message queue client 106 may determine whether the message published to the streaming data platform 107 was delivered successfully or unsuccessfully.

At dotted line 231, the distributed message queue system 105 may determine the message(s) that were not received by the streaming data platform 107. For example, streaming data platform 107 may throttle the data, an error may be returned to the client 106, the platform 107 may not respond, etc. Further, at line 231, the distributed message queue client 106 may retry publishing the messages(s) to the streaming data platform 107 when the publication of the message(s) are unsuccessful and until the message(s) are successfully delivered or a period of time has expired.

At line 233, the streaming data platform 107 may send the messages to the consumer system 109. The streaming data platform 107 may publish the data and one or more of the consumer system 109 may subscribe and receive particular data.

FIG. 3A illustrates an example processing flow 300 of system 100 where the service application 103 sends messages all of the messages to the distributed message queue system 105 to further send to the streaming data platform 107. In the illustrated processing flow 300 messages are being delivered to the streaming data platform 107 without failures.

At line 301 of processing flow 300, the service application 103 may receive streaming data from one or more data provider systems 101. The service application 103 may receive the data, process the data, and generate one or more messages of the streaming data to send to the streaming data platform 107.

At line 303, the service application 103 may send one or more messages to the distributed message queue system 105. For example service application 103 may communicate via API messages including the streaming data and processed streaming data to the distributed message queue service 102. The distributed message queue service 102 may store each of the messages the queue 104 for publishing to the streaming data platform 107.

At line 305, the distributed message queue system 105 may utilize the distributed message queue client 106 to publish each of the one or more messages stored in the queue 104 to the streaming data platform 107. The client 106 may retrieve the message(s) from the queue 104 and send the message(s) as a single message or in a batch, as previously discussed. Further and at line 307, the streaming data platform 107 may send the messages to the consumer system 109.

Figure 3B:
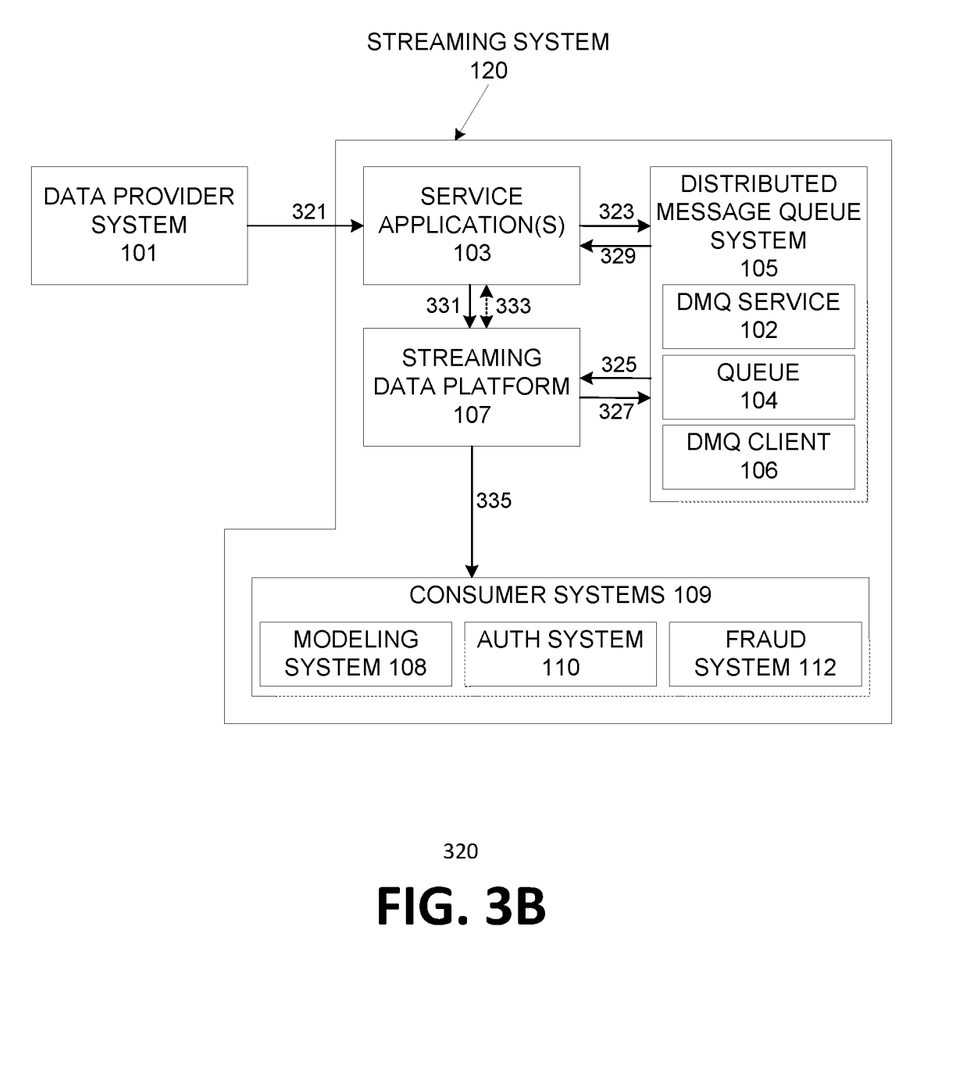
FIG. 3B illustrates a second example processing flow to provide streaming data resiliency.

FIG. 3B illustrates an example processing flow 320 similar to FIG. 3A. However, in this example processing flow 320, the distributed message queue system 105 may fail to deliver one or more messages to the streaming data platform 107. At lines 321, 323, and 325, the streaming system 120 performs the same operations as corresponding lines 301, 303, and 305, respectively.

However, as mentioned, some message(s) may not be delivered to the streaming data platform 107. At line 327, The distributed message queue client 106 may determine whether the message published to the streaming data platform 107 was delivered successfully or unsuccessfully. In these instances, the distributed message queue client 106 may store the undelivered messages back in the queue 104 and the distributed message queue service 102 may return an object to the service application 103 that a failure of delivery occurred at line 329. In embodiments, the service application 103 may determine a failure of delivery that occurred based on the information received from the distributed message queue system 105.

In embodiments, at line 331, the service application 103 may communicate undelivered messages directly to the streaming data platform 107. If messages communicated by the service application 103 to the streaming data platform 107, the service application 103 may retry sending the undelivered messages to the streaming data platform 107 at line 333. For example, the service application 103 may determine whether the message communicated directly to the streaming data platform 107 was successful or unsuccessful and retry communication of the message to the streaming data platform 107 when the message is unsuccessful. The service application 103 may continue to retry to communicate the message until delivery of to the streaming data platform 107 is successful or a defined period of time has expired. At line 335, the streaming data platform 107 may communicate received messages to the consumer systems 109, as previously discussed.

Figure 4:
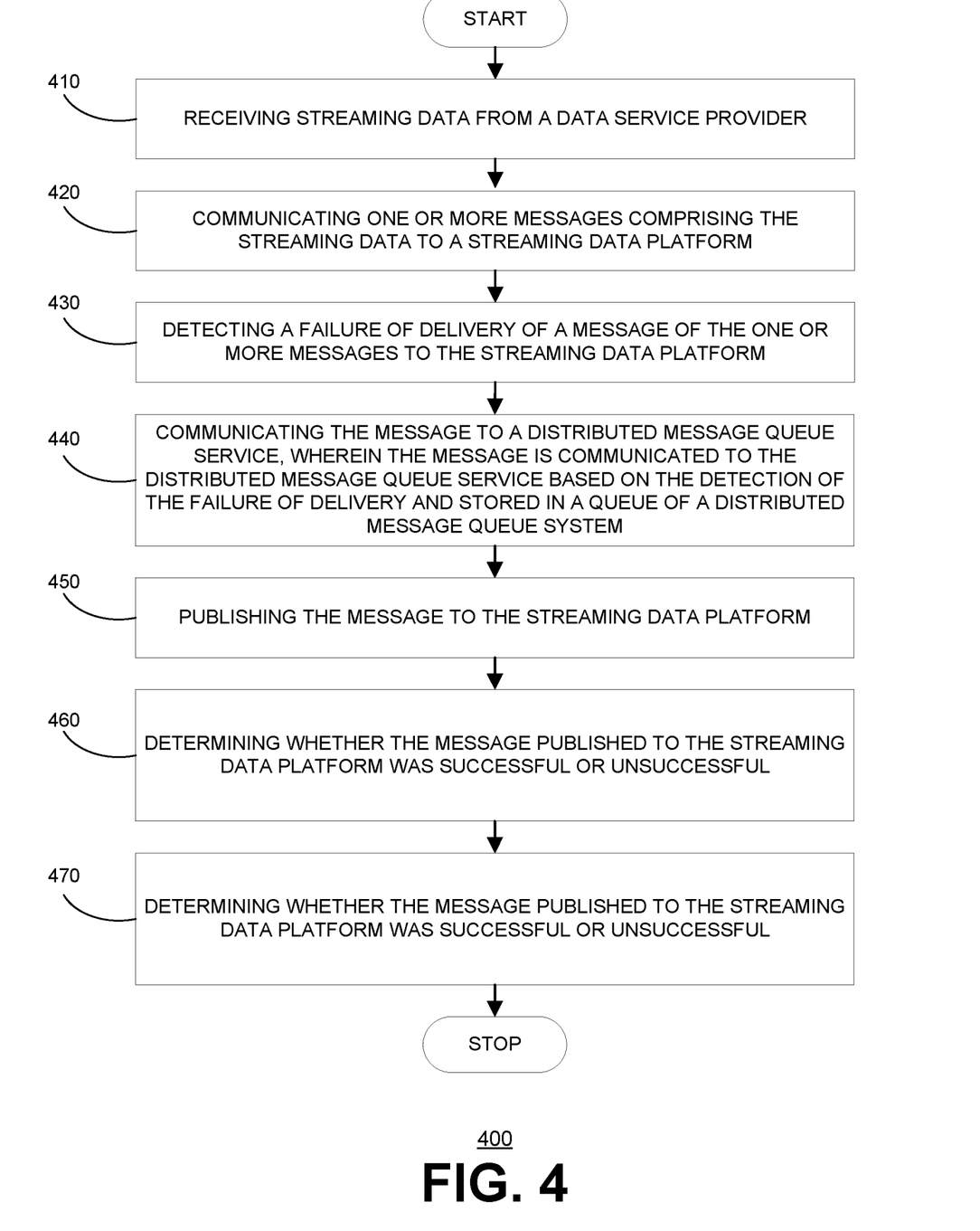
FIG. 4 illustrates an example logic flow.

FIG. 4. illustrates an example of a logic flow 400 that may be representative of one or more operations performed by a streaming system 100 to provide resilient streaming capabilities.

At block 410, the logic flow 400 includes receiving streaming data from a data service provider. In one example, the streaming data may be utilized by consumer system 109 to provide critical functionality, such as those found in a banking computing system. In embodiments, the streaming data may be received by a service application 103 of the streaming system 120 based on the service application 103. A service application 103 may perform operations and processing on the streaming data to provide services for the system 100.

At block 420, the logic flow 400 includes communicating one or more messages including the streaming data to a streaming data platform. The messages may be generated by the service application 103 in accordance with the streaming data platform 107. For example, the streaming data platform 107 may process data in a Java® format and may utilize a binary transmission control protocol (TCP)-based protocol. Further, the service application 103 may utilize a producer API to publish streams of records in a Java format. In other instances, the streaming data platform may utilize a consumer API and subscribe to streams of records in a Java format.

At block 430, the logic flow 400 includes detecting a failure of delivery of messages to the streaming data platform. For example, the service application 103 may receive an indication that a message cannot be delivered or the delivery timed out.

At block 440, based on the failure detection, the logic flow 400 includes communicating the message to a distributed message queue service. For example, the service application 103 may utilize an API provided by the service 102 of the distributed message queue system 105.

At block 450, the logic flow 400 includes publishing the message to the streaming data platform. More specifically, a distributed message queue client 106 may retrieve the failed message from a queue 104 and publish it to the streaming data platform 107.

At block 460, the logic flow 400 includes determining whether the message published to the streaming data platform was successful or unsuccessful. For example, the distributed message queue client 106 may determine if the message was delivered. In response to determining the message was delivered to the streaming data platform, the client 106 may notify the service application 103 via the service 102 and a return object.

At block 470, the logic flow 400 includes retrying publishing of the message to the streaming data platform when the publication of the message is unsuccessful. In some instances, the client 106 may retry sending the messages instantaneously, e.g., as soon as the client 106 knows of the failed delivery. In other instances, the client 106 may return the message to the queue 104 and may retry at a later point in time. For example, the queue 104 may be a first-in-first-out queue and the client 106 may retry once the failed message come through the queue.

Figure 5:
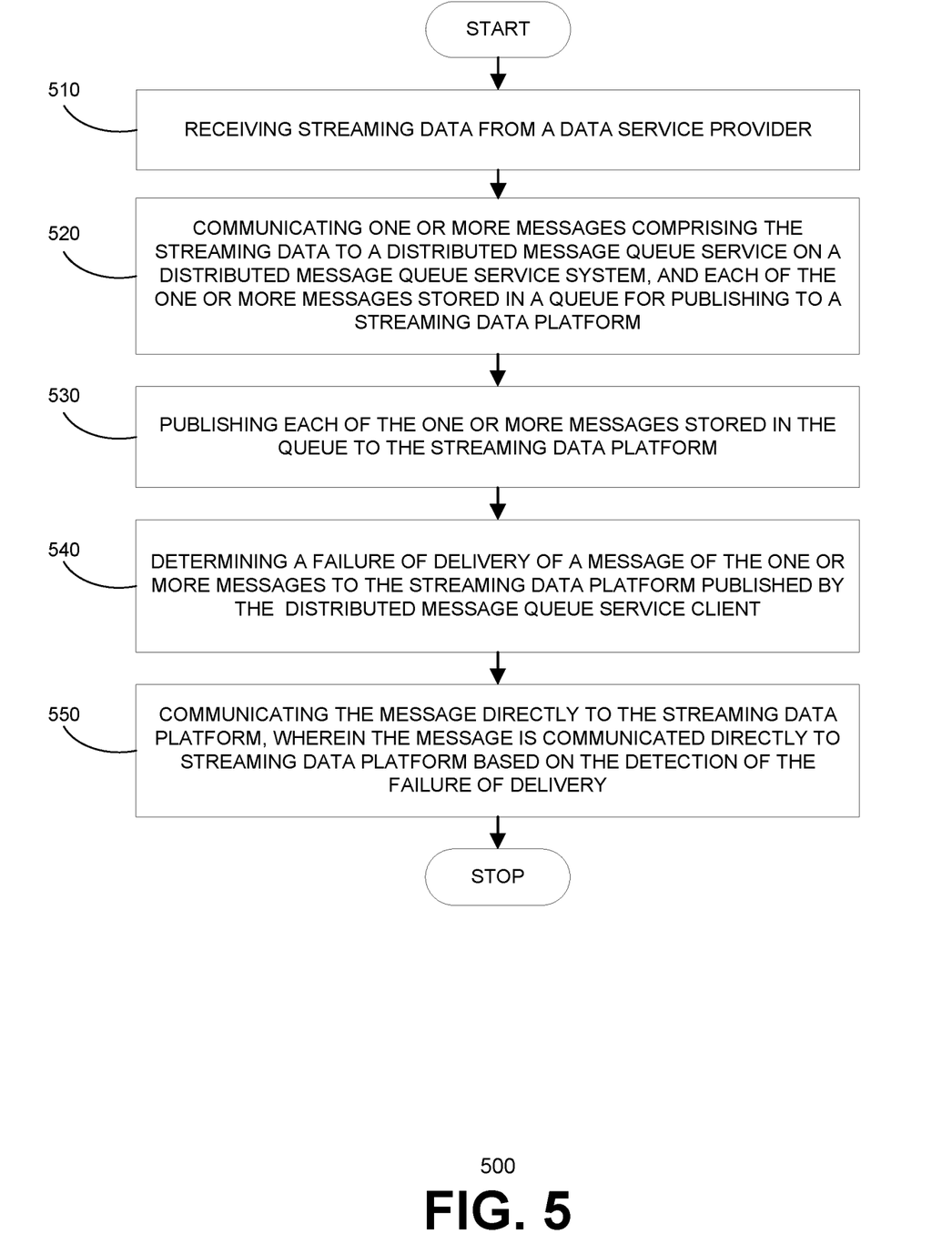
FIG. 5 illustrates a second example logic flow.

FIG. 5. illustrates an example of a logic flow 500 that may be representative of one or more operations performed by a streaming system 120 to provide resilient streaming capabilities.

At block 510, the logic flow 500 includes receiving streaming data from a data service provider, as similarly discussed with respect to block 410 of flow 400.

At block 520, the logic flow 500 includes communicating one or more messages comprising the data to a distributed message queue service on a distributed message queue service system. The distributed message queue service system may store each of the one or more messages in a queue for publishing to a streaming data platform.

At block 530, the logic flow 500 includes publishing each of the one or more messages stored in the queue to the streaming data platform. More specifically, a distributed message queue service client of the distributed message queue system may publish the messages stored in the queue to be received by the streaming data platform 107.

At block 540, the logic flow 500 includes determining a failure of delivery of a message of one or more messages to the streaming data platform published by the distributed message queue service client. More specifically, the service application 103 may receive an indication, e.g., via a return object, of a failure to deliver one or more messages from the distributed message queue system 105. At block 550, the logic flow 500 includes communicating, by the service application, the message directly to the streaming data platform.

Figure 6:
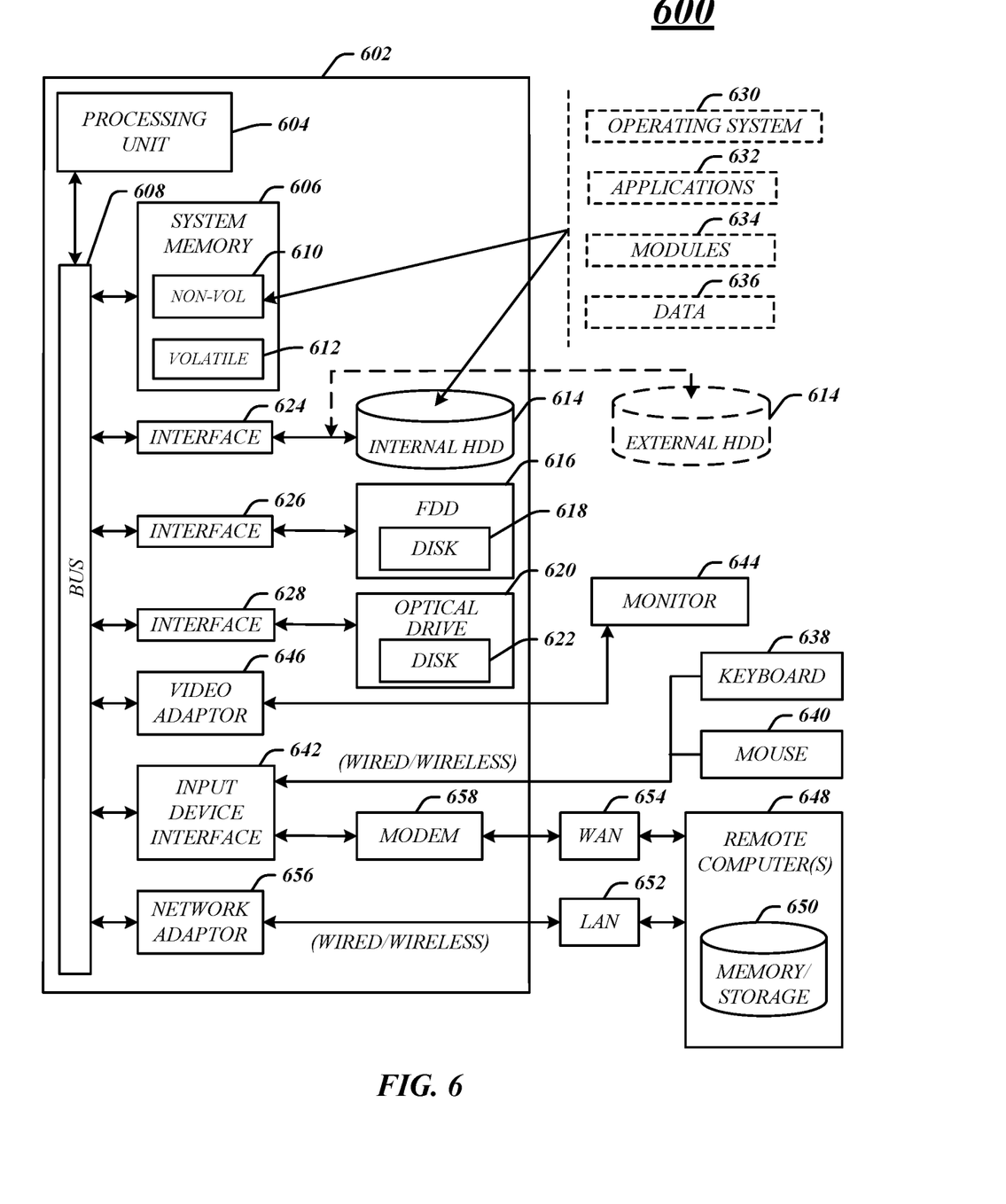
FIG. 6 illustrates an example of a system architecture.

As shown in FIG. 6, the computing architecture 600 can comprise a computer 602 having a processing unit 604, a system memory 606 and a system bus 608. The processing unit 604 can be any of various commercially available processors or can be a specially designed processor.

The system bus 608 provides an interface for system components including, but not limited to, an interface between the system memory 606 and the processing unit 604. The system bus 608 can be any of several types of bus structure that may further interconnect to a memory bus (with or without a memory controller), a peripheral bus, and a local bus using any of a variety of commercially available bus architectures.

The system memory 606 can include any type of computer-readable storage media including any type of volatile and non-volatile memory. The computer 602 can include any type of computer-readable storage media including an internal (or external) hard disk drive (HDD) 614. In various embodiments, the computer 602 can include any other type of disk drive such as, for example, a magnetic floppy disk and/or an optical disk drive. The HDD 614 can be connected to the system bus 608 by a HDD interface 624.

In various embodiments, any number of program modules can be stored in the drives and system memory 606 and/or 614 such as, for example, an operating system 630, one or more application programs 632, other program modules 634, and program data 636.

A user can enter commands and information into the computer 602 through one or more wired/wireless input devices such as, for example, a keyboard 638 and a pointing device, such as a mouse 640. These and other input devices can be connected to the processing unit 604 through an input device interface 642 that is coupled to the system bus 608. A monitor 644 or other type of display device can also be connected to the system bus 608 via an interface, such as a video adaptor 646. The monitor 644 may be internal or external to the computer 602.

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a smartphone, a tablet, a peer device or other common network node, and typically includes many or all of the elements described relative to the computer 602. The logical connections depicted include wired and/or wireless connectivity to networks 652 such as, for example, a local area network (LAN) and/or larger networks, for example, a wide area network (WAN). Networks 652 can provide connectivity to a global communications network such as, for example, the Internet. A network adapter 656 can facilitate wired and/or wireless communications to the networks 652. The computer 602 is operable to communicate over any known wired or wireless communication technology, standard, or protocol according to any known computer networking technology, standard, or protocol.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, novel subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A computer-implemented method, comprising:
 receiving, by a service application, data from a data service provider;
 communicating, by the service application, one or more messages comprising the data to a streaming data platform, wherein the service application initially communicates the one or more messages directly to the streaming data platform without utilizing a cloud-based queue;
 detecting, by the service application, a failure of delivery of a message of the one or more messages to the streaming data platform;
 communicating, by the service application and via an application programming interface (API), the message to a cloud-based distributed message queue service, wherein the message is communicated to the cloud-based distributed message queue service in response to the failure of delivery and stored in the cloud-based queue of a cloud-based distributed message queue system;
 publishing, by a cloud-based distributed message queue service client of the cloud-based distributed message queue system, the message to the streaming data platform;
 determining, by the cloud-based distributed message queue service client, whether the message published to the streaming data platform was successfully or unsuccessfully received by the streaming data platform; and
 retrying publishing, by the distributed message queue service client, of the message to the streaming data platform when publication of the message is unsuccessful.

2. The computer-implemented method of claim 1, wherein detecting the failure of delivery comprises detecting at least one of a delivery timeout, a connectivity failure, or a combination thereof.

3. The computer-implemented method of claim 1, wherein retrying publishing occurs until delivery of to the streaming data platform is successful or a defined period of time has expired.

4. The computer-implemented method of claim 1, comprising storing, by the cloud-based distributed message queue service, the message in the cloud-based queue of the cloud-based distributed message queue system until the message is successfully published to the streaming data platform or a defined period of time has expired.

5. The computer-implemented method of claim 4, comprising communicating, by the cloud-based distributed message queue service client, the message to the cloud-based distributed message queue system to store in the cloud-based queue when the publication of the message is unsuccessful.

6. The computer-implemented method of claim 1, wherein the data comprises at least one of authentication data, fraud data, model data, or combination thereof and the service application comprises one of an authentication engine, a fraud engine, or a modeling engine.

7. The computer-implemented method of claim 6, comprising publishing, by the streaming data platform, the authentication data to at least one of an authentication system and a modeling system.

8. The computer-implemented method of claim 6, comprising publishing, by the streaming data platform, the fraud data to a fraud detection system.

9. The computer-implemented method of claim 6, comprising publishing, by the streaming data platform, the model data to a modeling system.

10. A system, comprising:
 memory; and
 one or more processors coupled with the memory, the one or more processors configured to:

receive, by a service application, data from a data service provider;

communicate, by the service application, a plurality of messages comprising the data directly to a streaming data platform without utilizing a cloud-based queue of a cloud-based distributed message queue system unless one or more failures are detected;

detect, by the service application, a failure of delivery of at least one of the plurality of messages to the streaming data platform;

communicate, by the service application, the at least one of the plurality of messages to a cloud-based distributed message queue service of the cloud-based distributed message queue system, wherein the at least one of the plurality of messages are communicated to the cloud-based distributed message queue service in response to the failure of delivery and stored in the cloud-based queue of the cloud-based distributed message queue system for publication to the streaming data platform;

publish, by a cloud-based distributed message queue service client of the cloud-based distributed message queue system, the at least one of the plurality of messages to the streaming data platform;

determine, by the cloud-based distributed message queue service client, whether each of the at least one of the plurality of messages published to the streaming data platform was successfully or unsuccessfully published to the streaming data platform; and retry the publication, by the distributed message queue service client, of each unsuccessfully published messages of the at least one of the plurality of messages to the streaming data platform.

11. The system of claim 10, wherein the one or more processors to retry publication until delivery of to the streaming data platform is successful or a defined period of time has expired.

12. The system of claim 10, wherein the one or more processors are configured to detect the failure of delivery based on a detection at least one of a delivery timeout, a connectivity failure, or a combination thereof.

13. The system of claim 10, wherein the one or more processors are configured to store, by the cloud-based distributed message queue service, a message of the at least one of the plurality of messages in the cloud-based queue of the cloud-based distributed message queue system until the message is successfully published to the streaming data platform or a defined period of time has expired.

14. The system of claim 13, wherein the one or more processors are configured to communicate, by the cloud-based distributed message queue service client, the message to the cloud-based distributed message queue system to store in the cloud-based queue when the publication of the message is unsuccessful.

15. The system of claim 10, wherein the data comprises at least one of authentication data, fraud data, model data, or combination thereof and the service application comprises one of an authentication engine, a fraud engine, or a modeling engine.

16. The system of claim 15, wherein the one or more processors are configured to publish, by the streaming data platform, the authentication data to at least one of an authentication system and a modeling system.

17. The system of claim 15, wherein the one or more processors are configured to publish, by the streaming data platform, the fraud data to a fraud detection system.

18. The system of claim 15, wherein the one or more processors are configured to publish, by the streaming data platform, the model data to a modeling system.

* * * * *